(12) United States Patent
Lee et al.

(10) Patent No.: US 10,708,884 B2
(45) Date of Patent: Jul. 7, 2020

(54) METHOD AND DEVICE FOR TERMINAL TRANSMITTING/RECEIVING DATA

(71) Applicant: LG Electronics Inc., Seoul (KR)

(72) Inventors: Youngdae Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/475,990

(22) PCT Filed: Jan. 5, 2018

(86) PCT No.: PCT/KR2018/000254
§ 371 (c)(1),
(2) Date: Jul. 3, 2019

(87) PCT Pub. No.: WO2018/128463
PCT Pub. Date: Jul. 12, 2018

(65) Prior Publication Data
US 2019/0349886 A1  Nov. 14, 2019

Related U.S. Application Data

(60) Provisional application No. 62/442,910, filed on Jan. 5, 2017.

(51) Int. Cl.
*H04W 68/02* (2009.01)
*H04W 76/28* (2018.01)
*H04W 74/08* (2009.01)

(52) U.S. Cl.
CPC ....... *H04W 68/02* (2013.01); *H04W 74/0833* (2013.01); *H04W 76/28* (2018.02)

(58) Field of Classification Search
CPC .......................... H04W 68/02; H04W 76/028; H04W 74/0833
See application file for complete search history.

(56) References Cited

U.S. PATENT DOCUMENTS

2011/0002281 A1   1/2011 Terry et al.
2017/0367050 A1* 12/2017 Nagasaka ............. H04W 68/02
(Continued)

FOREIGN PATENT DOCUMENTS

KR      20120076361      7/2012
KR      20150079940      7/2015
(Continued)

OTHER PUBLICATIONS

Partial Supplementary European Search Report in European Application No. 18736373.4, dated Aug. 29, 2019, 18 pages.
(Continued)

*Primary Examiner* — Wayne H Cai
(74) *Attorney, Agent, or Firm* — Fish & Richardson P.C.

(57) ABSTRACT

Provided are a method for a terminal receiving downlink data in a wireless communication system, and a device supporting same. The method may comprise the steps of: entering a radio resource control (RRC)_INACTIVE state; receiving a configuration associated with a first DRX cycle and a second DRX cycle; receiving a first paging message on the basis of the first DRX cycle; stopping the use of the first DRX cycle if the first paging message indicates that downlink data has been transmitted to the terminal without an RRC state transition; and receiving the downlink data from a base station in the RRC_INACTIVE state on the basis of the second DRX cycle.

16 Claims, 12 Drawing Sheets

(56) References Cited

U.S. PATENT DOCUMENTS

2019/0349970 A1* 11/2019 Chen ................ H04W 52/0229
2020/0015315 A1* 1/2020 Fujishiro ............... H04W 76/11

FOREIGN PATENT DOCUMENTS

| WO | WO2014073781 | 5/2014 |
| WO | WO2015085273 | 6/2015 |

OTHER PUBLICATIONS

CATT, "Small data transmission in inactive state," R2-166118, 3GPP TSG-RAN WG2 Meeting #95bis, Kaohsiung, Oct. 10-14, 2016, 4 pages.
Huawei, HiSilicon, "DL data transmission in RRC INACTIVE," R2-168860, 3GPP TSG-RAN WG2 #96, Reno, Nevada, USA, Nov. 14-18, 2016, 3 pages.
LG Electronics, "The state of UE and UE ID in lightweight connection," R2-168940, 3GPP TSG-RAN WG2 #96, Reno, Nevada, USA, Nov. 14-19, 2016, 2 pages.

* cited by examiner

METHOD AND DEVICE FOR TERMINAL TRANSMITTING/RECEIVING DATA

CROSS-REFERENCE TO RELATED APPLICATIONS

This application is a National Stage application under 35 U.S.C. § 371 of International Application No. PCT/KR2018/000254, filed on Jan. 5, 2018, which claims the benefit of U.S. Provisional Application No. 62/442,910, filed on Jan. 5, 2017. The disclosures of the prior applications are incorporated by reference in their entirety.

BACKGROUND OF THE INVENTION

Field of the Invention

The present invention relates to wireless communication and, more particularly, to a method for terminal in RRC_INACTIVE transmitting/receiving data and device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In the discussion of NR standardization, an RRC_CONNECTED state and an RRC_IDLE state are defined by default as an RRC state, and an RRC_INACTIVE state is additionally introduced. A user equipment (UE) in the RRC_INACTIVE state performs a radio control procedure similarly to the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state.

SUMMARY OF THE INVENTION

Meanwhile, it is discussed whether downlink data can be transmitted to a terminal in the RRC_INACTIVE state, and several methods of transmitting downlink data to the terminal in the RRC_INACTIVE state have been proposed. However, currently proposed methods have problems such as causing serious radio resource waste, large delay and so on. Therefore, in order to reduce radio resource waste, reduce delay, and improve battery saving, it is necessary to provide a method of transmitting/receiving data by a terminal in RRC_INACTIVE state and a device supporting the method.

In an embodiment, provided is a method for a terminal receiving downlink data in a wireless communication system. The method may comprise the steps of entering a radio resource control (RRC)_INACTIVE state; receiving a configuration related to a first DRX cycle and a second DRX cycle; receiving a first paging message based on the first DRX cycle; stopping the use of the first DRX cycle if the first paging message indicates that downlink data has been transmitted to the terminal without an RRC state transition; and receiving the downlink data from a base station in the RRC_INACTIVE state based on the second DRX cycle.

In another embodiment, provided is a method for a terminal transmitting uplink data in a wireless communication system. The method may comprise the steps of entering a radio resource control (RRC)_INACTIVE state; receiving a configuration related to a first DRX cycle and a second DRX cycle; determining to transmit uplink data without an RRC state transition; stopping the use of the first DRX cycle; and transmitting the uplink data to a base station in the RRC_INACTIVE state based on the second DRX cycle.

In another embodiment, provided is a terminal receiving downlink data in a wireless communication system. The terminal may comprise a processor coupled to the memory, and the transceiver, and wherein the processor controls entering a radio resource control (RRC)_INACTIVE state; receiving a configuration related to a first DRX cycle and a second DRX cycle; receiving a first paging message based on the first DRX cycle; stopping the use of the first DRX cycle if the first paging message indicates that downlink data has been transmitted to the terminal without an RRC state transition; and receiving the downlink data from a base station in the RRC_INACTIVE state based on the second DRX cycle.

A terminal in the RRC_INACTIVE state can efficiently perform data transmission and reception.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system on the basis of the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
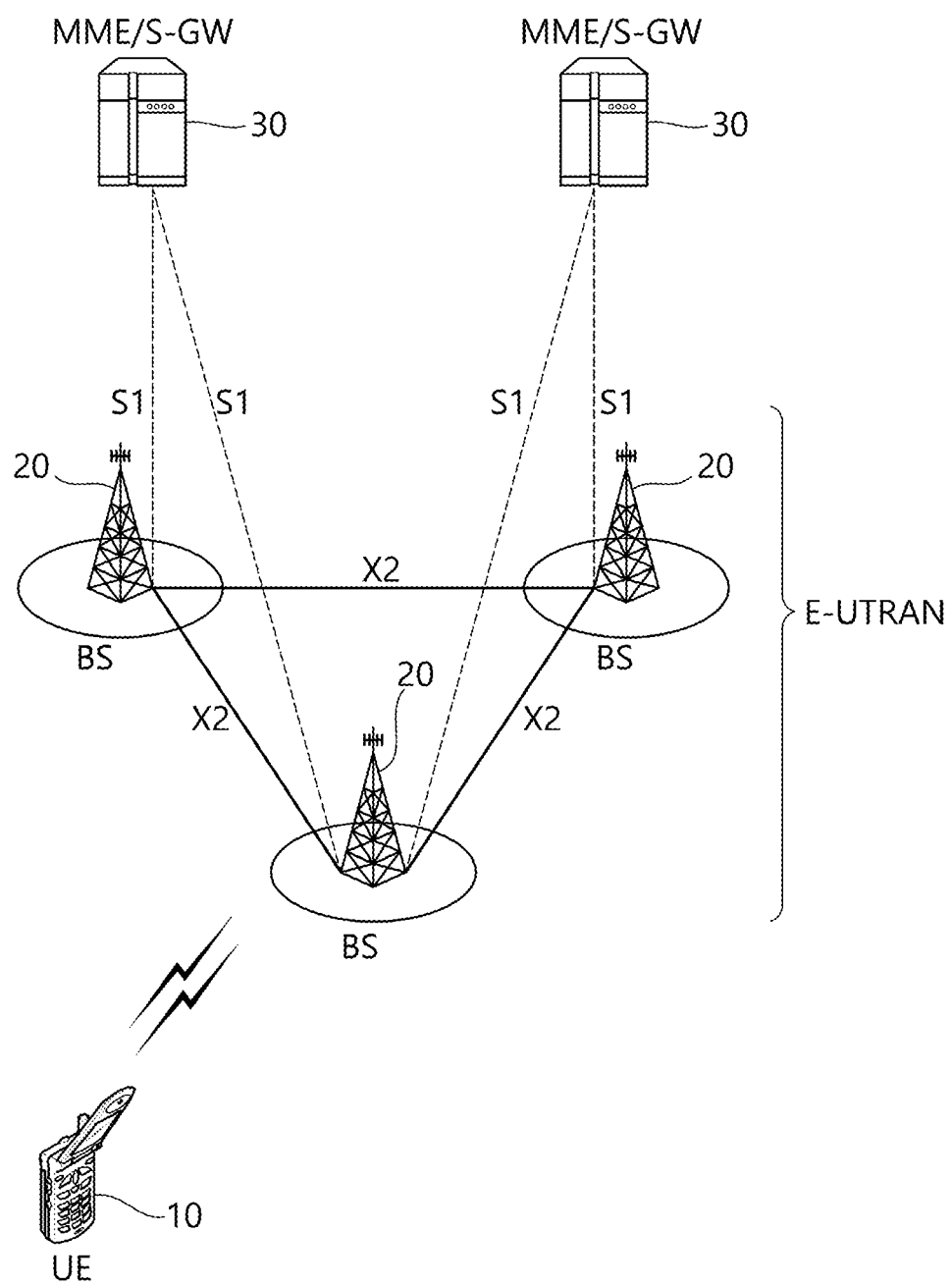
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement on the basis of APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
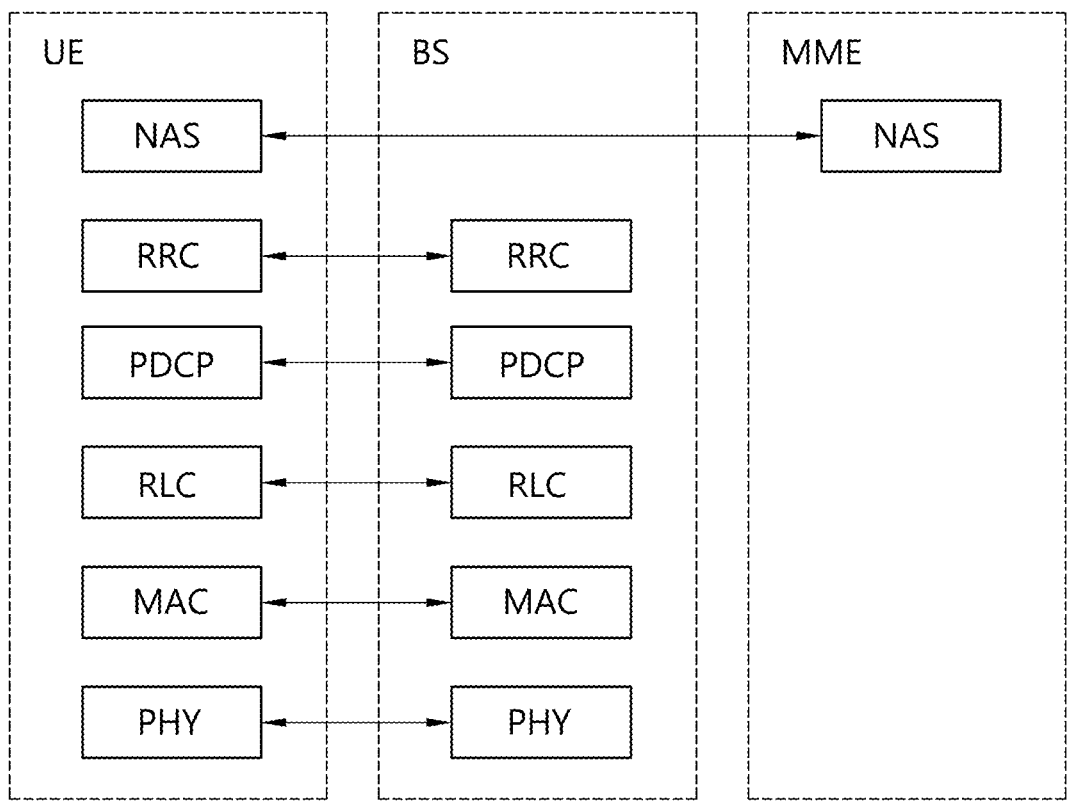
FIG. 2 shows a control plane of a radio interface protocol of an LTE system.
Figure 3:
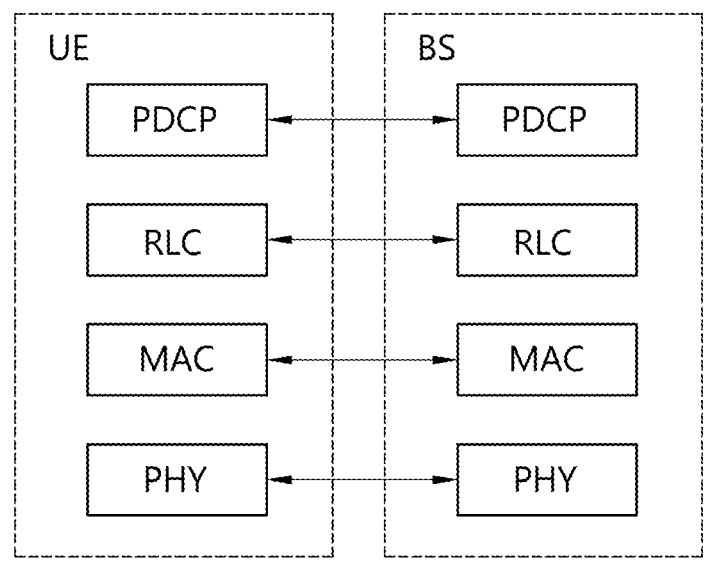
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) on the basis of the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARD) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random-access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARD). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and an RRC Connection Procedure are Described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE needs to transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G Network Structure is Described.

Figure 4:
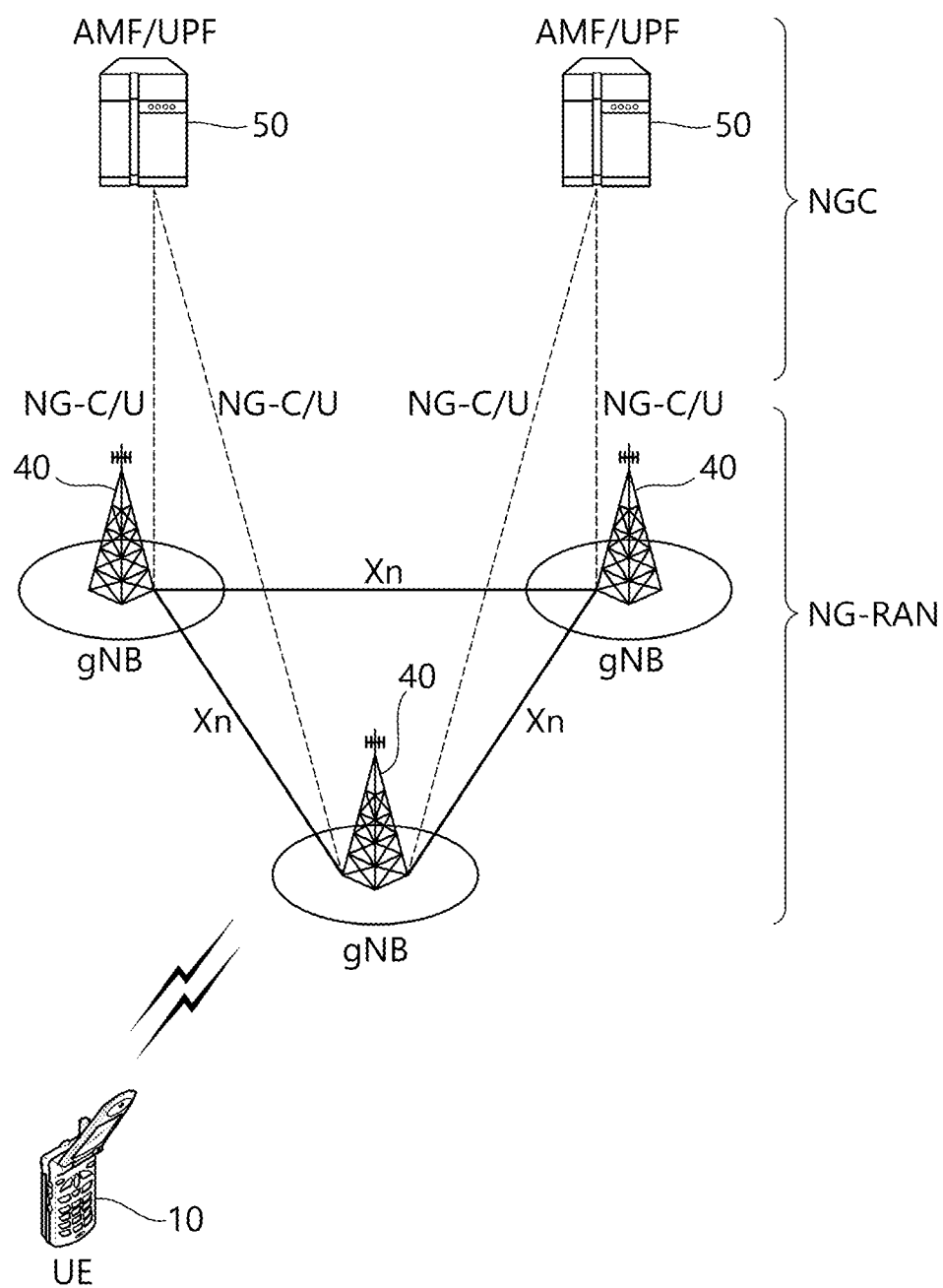
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure on the basis of an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
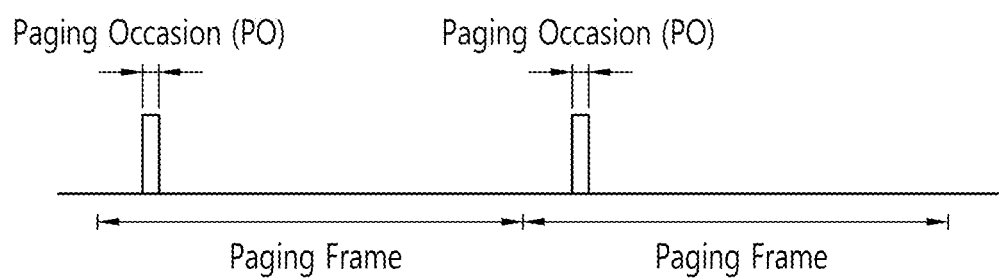
FIG. 5 shows an example of a paging occasion.

FIG. 5 shows an example of a paging occasion.

Referring to FIG. 5, there may be a paging occasion (PO) within a paging frame. The UE in the RRC_IDLE state can monitor the PDCCH addressed to the P-RNTI in the paging occasion. The paging occasion may be referred to as paging DRX. The paging occasion may be defined as a per paging frame, and the paging occasion and the paging frame may be derived by the UE on the basis of the UE ID. If the UE detects the PDCCH in the paging occasion, the UE can decode the paging message received on the PCH as indicated by the PDCCH information. The paging message may include various information including a UE ID. On the basis of the UE ID information, the UE can determine whether a paging message targets the UE. If the UE ID included in the paging message matches the ID of the UE, the UE may initiate a random-access procedure to generate an RRC connection.

Hereinafter, an RRC_INACTIVE State of a UE is Described.

In the discussion on NR standardization, an RRC_INACTIVE state has been newly introduced in addition to the existing RRC_CONNETED state and RRC_IDLE state. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG interface between a gNB and a NGC or an S1 interface between an eNB and an EPC may be maintained. In the RRC_INACTIVE state, a core network recognizes that the UE is normally connected to a BS. On the other hand, the BS may not perform connection management for the UE in RRC_INACTIVE state.

For a UE in a lightly connected mode, an MME may maintain the S1 connection of the activated UE in order to hide a state transition and mobility from a core network. That is, for a UE in the RRC_INACTIVE state, an AMF may maintain the NG connection of the activated UE in order to hide a state transition and mobility from a next-generation core (NGC). In this specification, an RRC_INACTIVE state may be similar in concept to a lightly connected mode, a lightweight connected mode, or a semi-connected mode.

The RRC_INACTIVE state may have the following characteristics.

Cell re-selection mobility;
CN—NR RAN connection (both C/U-planes) has been established for UE.
The UE AS context is stored in at least one of gNB and the UE;
Notification is initiated by NR RAN.
RAN-based notification area is managed by NR RAN.
NR RAN knows the RAN-based notification area which the UE belongs to.

Meanwhile, whether or not downlink data can be transmitted to a UE in the RRC_INACTIVE state is currently under discussion, and several methods of transmitting downlink data to the UE in the RRC_INACTIVE state have been proposed.

First, the downlink data can be transmitted to the UE in the RRC_INACTIVE state using the paging message. The downlink data may be included in the paging message or transmitted together with the paging message. This method requires downlink data to be transmitted from every cell in the RAN, which causes severe radio resource wastage.

Second, the downlink data may be transmitted to the UE in the RRC_INACTIVE state during the random-access procedure. The UE can initiate the random-access procedure after receiving the paging message and the UE can receive the downlink data in the message 4 during the random-access procedure. This method requires a UE to initiate a random-access procedure, which causes large delay before receiving the downlink data.

Third, the downlink data may be transmitted to the UE in the RRC_INACTIVE state on the downlink shared channel. The downlink data may be transmitted through the downlink shared channel, and the UE may be set to CONNECTED MODE DRX to monitor the PDCCH for the downlink shared channel. The CONNECTED MODE DRX is not good for battery saving compared with an IDLE MODE DRX and it may go contrary to the purpose of the RRC_INACTIVE state.

Since the above-described methods have disadvantages, a new method for reducing radio resource waste, reducing delay, and improving battery saving needs to be considered. Hereinafter, a method for receiving downlink data in the RRC_INACTIVE state according to an embodiment of the present invention and a device supporting the method will be described.

According to an embodiment of the present invention, a first DRX cycle and a second DRX cycle may be defined. In this specification, a DRX cycle may be referred to as a paging DRX cycle, a notification DRX cycle, or a paging/notification DRX cycle. The base station may configure the first DRX cycle and the second DRX cycle for the UE. For example, when the UE enters the RRC_INACTIVE state, the base station may configure the first DRX cycle and the second DRX cycle for the UE. For example, when the UE enters the RAN based area, the base station may configure the first DRX cycle and the second DRX cycle for the UE. The first DRX cycle and the second DRX cycle may be configured by system information. Alternatively, the first DRX cycle and the second DRX cycle may be configured by dedicated RRC signaling.

The first DRX cycle may correspond to either an RRC level DRX cycle or a MAC level DRX cycle. The second DRX cycle may correspond to either the RRC level DRX cycle or the MAC level DRX cycle. The first DRX cycle and the second DRX cycle may have different lengths. For example, the second DRX cycle may be shorter than the first DRX cycle. The paging or notification may be triggered by a base station such as a gNB and may be triggered by an EPC or a core network entity of NextGenCore.

Figure 6:
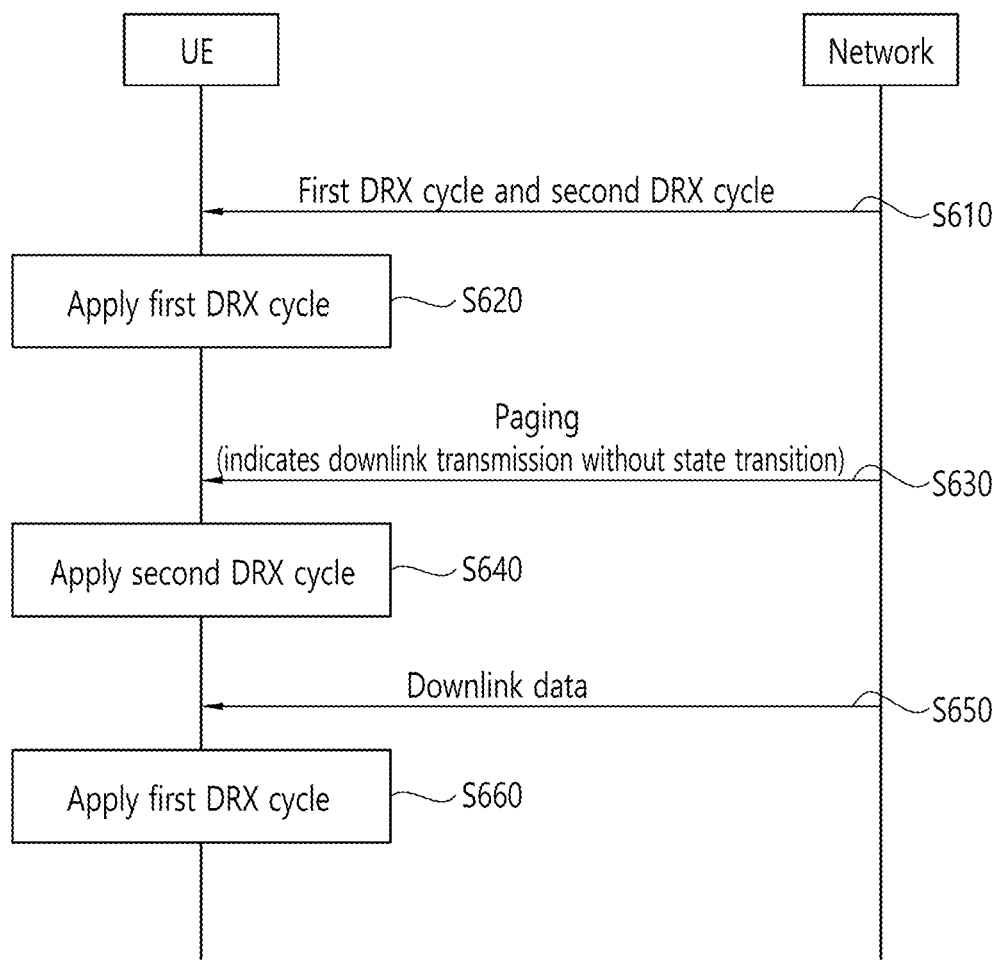
FIG. 6 shows a procedure for changing a DRX cycle for a UE to receive downlink data according to an embodiment of the present invention.

FIG. 6 shows a procedure for changing a DRX cycle for a UE to receive downlink data according to an embodiment of the present invention.

Referring to FIG. 6, in step S610, the UE can set a first DRX cycle and a second DRX cycle. The UE may be in the RRC_INACTIVE state. The first DRX cycle may include at least one of a DRX length, a paging frame, and a paging occasion. The second DRX cycle may include at least one of a DRX length, a paging frame, and a paging occasion. In addition, the UE can be configured for a timer value.

In step S620, the UE may apply the first DRX cycle. Then, the UE can periodically monitor paging or notification transmissions at the UE's paging occasion in the first DRX cycle. That is, the UE can monitor the PDCCH addressed by the P-RNTI on all paging occasions in accordance with the first DRX cycle. The second DRX cycle may not be applied while the first DRX cycle is applied. The paging occasion in the first DRX cycle may consist of a set of subframes and may be calculated based on the first UE ID of the UE. The first UE ID may be allocated by NextGenCore (5G-CN), EPC, gNB or eNB.

In step S630, the UE may acquire a paging message. The paging message may include an ID of a UE targeted by the paging message. If the UE ID included in the paging message matches the ID stored in the UE, the UE can regard the target of the paging message as its own. Additionally, the paging message may include an indicator indicating that the purpose of the paging message is transmission of downlink data. Alternatively, the paging message may indicate downlink transmission to the UE without state transition to another RRC state (e.g., RRC_CONNECTED state, RRC_IDLE state, or RRC_ACTIVE state).

The paging message can be obtained by the UE decoding the transport block on the PCH. Specifically, if the UE receives a PDCCH addressed by a P-RNTI on a paging occasion in accordance with the first DRX cycle, the UE can decode the transport block on the PCH and obtain a paging message. The PCH may be related to a PDCCH addressed by the P-RNTI.

In step S640, the UE can determine whether the paging message includes an indicator indicating that the purpose of the paging message is transmission of downlink data. That is, the UE can confirm whether the paging message indicates transmission of downlink data without state transition. If the paging message includes the indicator, the UE applying the first DRX cycle can apply the second DRX cycle without applying the first DRX cycle any more. That is, if the paging message indicates transmission of downlink data without state transition, the UE can stop applying the first DRX cycle during the RRC_INACITVE state and start applying the second DRX cycle during the RRC_INACITVE state.

The paging occasion in the second DRX cycle may be consisted of a set of subframes and may be calculated based on the second UE ID of the UE. The second UE ID may be allocated by NextGenCore (5G-CN), EPC, gNB or eNB. The first UE ID and the second UE ID of the UE may be the same or different. The first UE ID may be any one of an IMSI, an s-TMSI, and a specific RNTI, and the second UE ID may be any one of an IMSI, an s-TMSI, and a specific RNTI. For example, if the first UE ID of the UE differs from the second UE ID, the first UE ID may be the IMSI allocated by the core network, and the second UE ID may be the P-RNTI allocated by the eNB or gNB or a particular RNTI, such as a C-RNTI.

The UE can monitor the PDCCH addressed by the P-RNTI on the paging occasion of the second DRX cycle.

In step S650, whenever the UE receives the PDCCH addressed by the P-RNTI on the paging occasion of the second DRX cycle, the UE may receive the PDSCH related to the PDCCH and may transmit the PDSCH related to the transport block, and may receive the downlink data. Whenever the UE receives a PDCCH or a transport block, the UE can start a timer. Alternatively, whenever the UE receives a PDCCH or a transport block, the UE can re-start the timer that is being executed.

In step S660, if the downlink data includes the "End of Data" indication from the paging message, the UE can apply the first DRX cycle without applying the second DRX cycle any more. If the paging message indicating the ID of the UE does not include an indicator indicating that the purpose of the paging message is transmission of the downlink data, the UE can apply the first DRX cycle without applying the second DRX cycle any more. If the paging message indicating the ID of the UE does not indicate the transmission of downlink data without state transition, the UE can apply the first DRX cycle without applying the second DRX cycle any more. If the timer expires according to the timer value, the UE can apply the first DRX cycle without applying the second DRX cycle any more. If the base station indicates to the UE that the downlink data transmission has been completed, the UE can apply the first DRX cycle without applying the second DRX cycle any more. If the base station indicates to the UE that there is no downlink data available for transmission to the UE, the UE can apply the first DRX cycle without applying the second DRX cycle any more. If the base station indicates the first DRX cycle to the UE, the UE can apply the first DRX cycle without applying the second DRX cycle any more.

Figure 7:
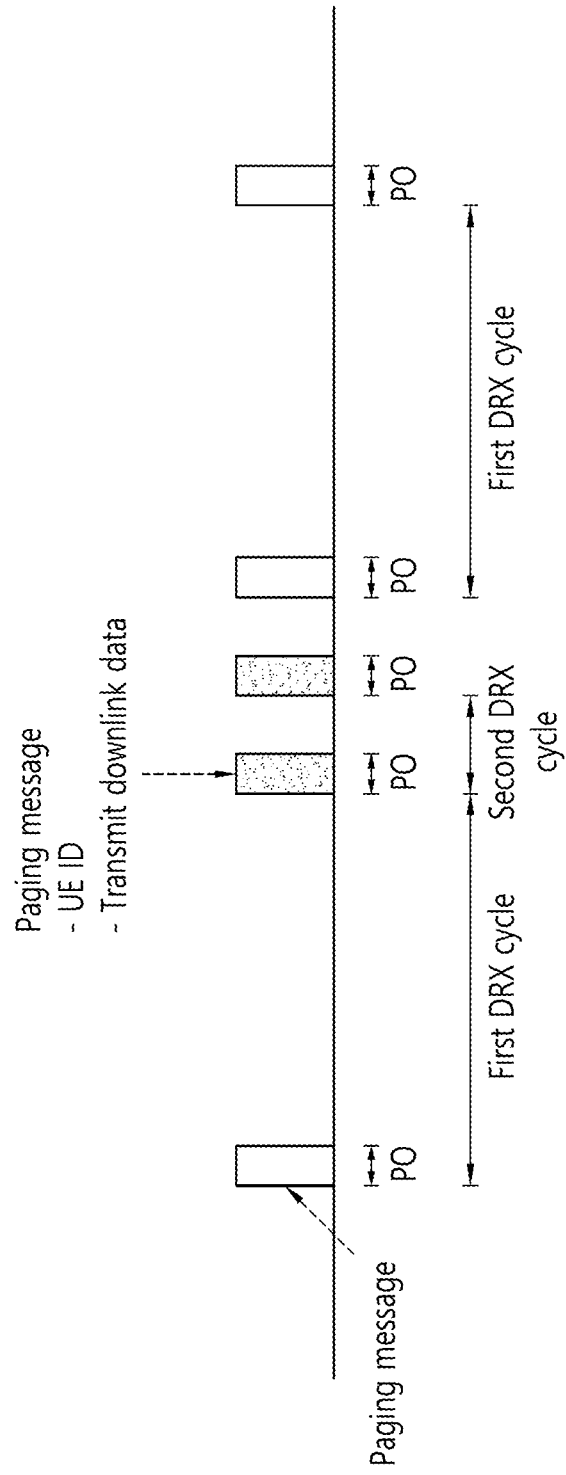
FIG. 7 shows an example in which a UE changes a DRX cycle and receives downlink data according to an embodiment of the present invention.

FIG. 7 shows an example in which a UE changes a DRX cycle and receives downlink data according to an embodiment of the present invention.

Referring to FIG. 7, a UE can receive a paging message at a paging occasion in a first DRX cycle. If the paging message indicates downlink transmission without state transition, the UE may stop applying the first DRX cycle and apply the second DRX cycle. During the second DRX cycle, the UE in the RRC_INACTIVE state can receive downlink data. Thereafter, if the specific condition described in step S660 is satisfied, the UE can stop applying the second DRX cycle and apply the first DRX cycle again. According to an embodiment of the present invention, the UE in the RRC_INACTIVE state applies the second DRX cycle for downlink data reception, so that radio resources can be efficiently used, delay can be reduced, battery saving can be improved.

Figure 8:
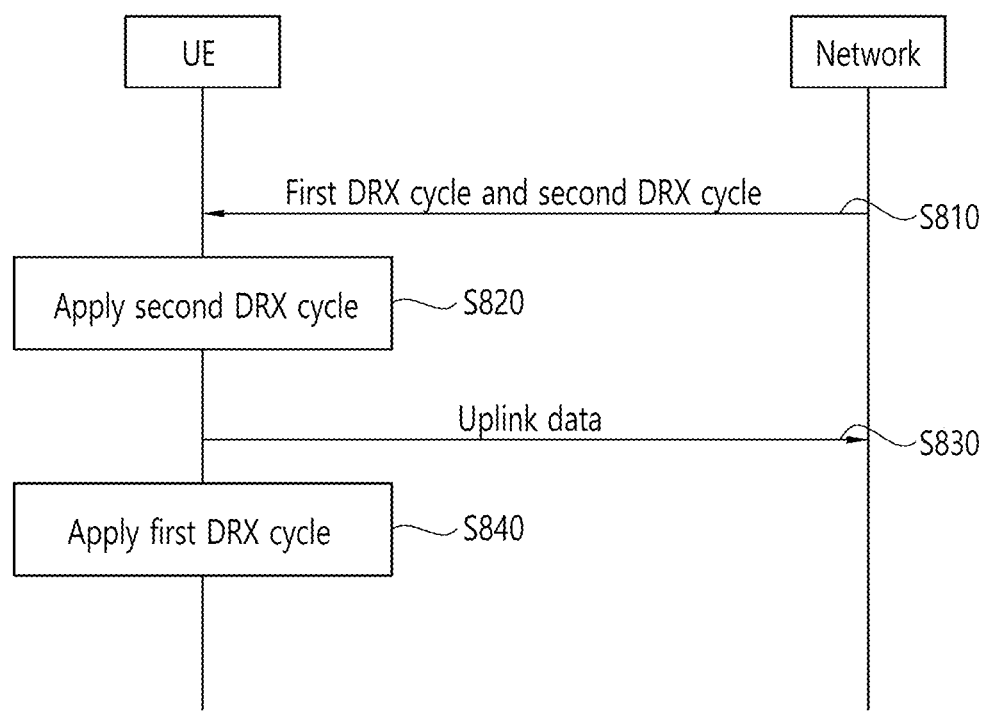
FIG. 8 shows a procedure for a UE to change a DRX cycle for transmission of uplink data according to an embodiment of the present invention.

FIG. 8 shows a procedure for a UE to change a DRX cycle for transmission of uplink data according to an embodiment of the present invention.

Referring to FIG. 8, in step S810, the UE can be configured for a first DRX cycle and a second DRX cycle. The UE may be in the RRC_INACTIVE state. The first DRX cycle may include at least one of a DRX length, a paging frame, and a paging occasion. The second DRX cycle may include at least one of a DRX length, a paging frame, and a paging occasion. In addition, the UE can set a timer value.

Basically, the UE can apply the first DRX cycle. Then, the UE can periodically monitor paging or notification transmissions at the UE's paging occasion in the first DRX cycle. That is, the UE can monitor the PDCCH addressed by the P-RNTI on every paging occasion in accordance with the first DRX cycle. The second DRX cycle may not be applied while the first DRX cycle is applied. The paging occasion in the first DRX cycle may consist of a set of subframes and may be calculated based on the first UE ID of the UE. The first UE ID may be allocated by NextGenCore (5G-CN), EPC, gNB or eNB. The UE can acquire the paging message. The paging message may include an ID of a UE targeted by the paging message. If the UE ID included in the paging message matches the ID stored in the UE, the UE can regard the target of the paging message as its own.

If the UE has data available for transmission in the uplink buffer of the UE, the UE can start the random-access procedure. Then, the UE can transmit the random-access preamble and the message 3 in the random-access procedure.

In step S820, if the UE has data available for transmission in the UL buffer of the UE, the UE can apply the second DRX cycle without applying the first DRX cycle any more. When the UE starts the random-access procedure, the UE can apply the second DRX cycle without applying the first DRX cycle any more. If the UE transmits a message 3 or a random-access preamble on the PUSCH, the UE can apply the second DRX cycle without applying the first DRX cycle any more. If the UE transmits the transport block on the PUSCH in the uplink, the UE can apply the second DRX cycle without applying the first DRX cycle any more.

The paging occasion in the second DRX cycle may be consisted of a set of subframes and may be calculated based on the second UE ID of the UE. The second UE ID may be allocated by NextGenCore (5G-CN), EPC, gNB or eNB. The first UE ID and the second UE ID of the UE may be the same or different. The first UE ID may be any one of an IMSI, an s-TMSI, and a specific RNTI, and the second UE ID may be any one of an IMSI, an s-TMSI, and a specific RNTI. For example, if the first UE ID of the UE differs from the second UE ID, the first UE ID may be the IMSI allocated by the core network, and the second UE ID may be the P-RNTI allocated by the eNB or gNB or a particular RNTI, such as a C-RNTI.

The UE can monitor the PDCCH addressed by the P-RNTI on the paging occasion of the second DRX cycle.

In step S830, the UE can perform uplink transmission. The uplink transmission may be performed on the second DRX cycle. Whenever the UE transmits a transport block on the uplink, or whenever the UE initiates a random-access procedure, the UE can start the timer or re-start the timer that is being executed.

In step S840, if the UE detects that there is no data available for transmission in the uplink buffer of the UE, the UE can apply the first DRX cycle without applying the second DRX cycle any more. If the UE successfully completes the random-access procedure, the UE can apply the first DRX cycle without applying the second DRX cycle any more. If the UE successfully completes the uplink transmission of all the transport blocks that need to be transmitted on the PUSCH, the UE can apply the first DRX cycle without applying the second DRX cycle any more. If the timer expires according to the timer value, the UE can apply the first DRX cycle without applying the second DRX cycle any more.

Alternatively, if the UE determines to transmit uplink data without state transition to another RRC state (e.g., RRC_CONNECTED state, RRC_IDLE state, or RRC_ACTIVE state), the UE may stop the first DRX cycle during the RRC_INACITVE state. Then, the UE may change to the second DRX cycle during the RRC_INACTIVE state, or may not perform paging or notification DRX.

Figure 9:
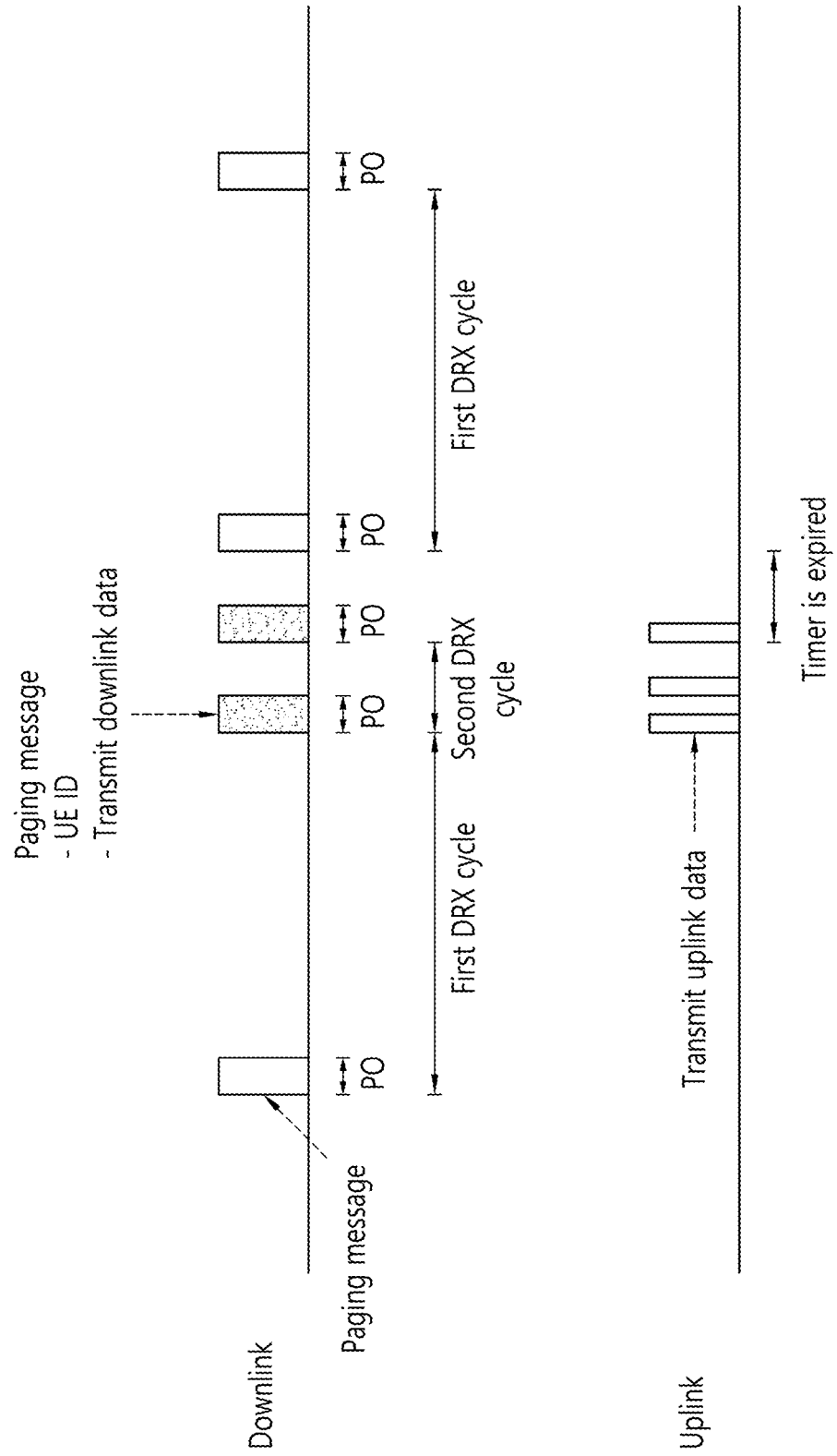
FIG. 9 shows an example in which a UE changes a DRX cycle and transmits uplink data according to an embodiment of the present invention.

FIG. 9 shows an example in which a UE changes a DRX cycle and transmits uplink data according to an embodiment of the present invention.

Referring to FIG. 9, a UE in the RRC_INACTIVE state can perform both reception of downlink data and transmission of uplink data. If the UE performs both the reception of the downlink data and the transmission of the uplink data and the UE applies the second DRX cycle, the UE in the RRC_INACTIVE state continues applying the second DRX cycle until the reception of the downlink data and the transmission of the uplink data are both completed. According to an embodiment of the present invention, a UE in the RRC_INACTIVE state applies a second DRX cycle for uplink data transmission, so that radio resources can be efficiently used, delay can be reduced, and battery saving can be improved.

Figure 10:
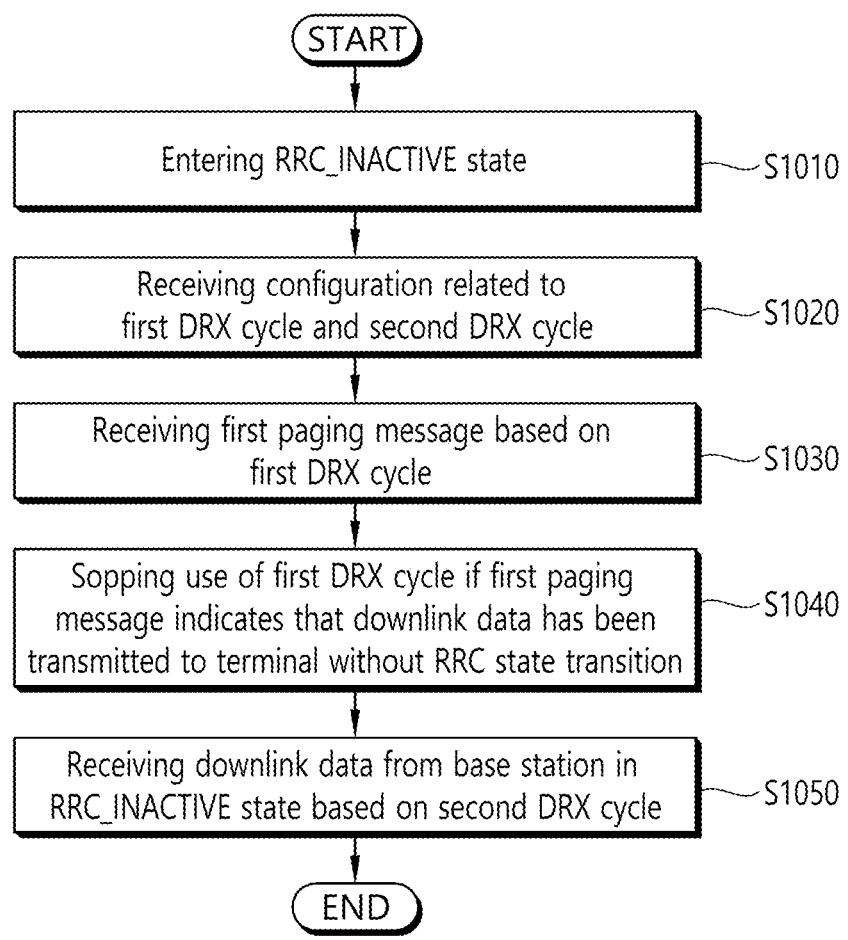
FIG. 10 is a block diagram illustrating a method for a terminal receiving downlink data according to an embodiment of the present invention.

FIG. 10 is a block diagram illustrating a method for a terminal receiving downlink data according to an embodiment of the present invention.

Referring to FIG. 10, in step S1010, the terminal may enter the RRC_INACTIVE state.

In step 1020, the terminal may receive a configuration related to a first DRX cycle and a second DRX cycle. A period of the first DRX cycle is longer than a period of the second DRX cycle.

In step 1030, the terminal may receive a first paging message based on the first DRX cycle. The first paging message may be received in a paging occasion of the first DRX cycle. The paging occasion of the first DRX cycle may be calculated based on a first identifier (ID) of the terminal.

In step 1040, the terminal may stop the use of the first DRX cycle if the first paging message indicates that downlink data has been transmitted to the terminal without an RRC state transition.

In step 1040, the terminal may receive the downlink data from a base station in the RRC_INACTIVE state based on the second DRX cycle. The downlink data may be received in a paging occasion of the second DRX cycle. The paging occasion of the second DRX cycle may be calculated based on a second identifier of the terminal. the first identifier and the second identifier may be differently allocated.

In addition, the terminal may initiate a timer if the downlink data is received. If the timer expires, the use of the second DRX cycle may be stopped, and the use of the first DRX cycle may be resumed In addition, the terminal may receive a second paging message based on the second DRX cycle. If the second paging message does not indicate that downlink data has been transmitted to the terminal without an RRC state transition, the use of the second DRX cycle may be stopped and the use of the first DRX cycle may be resumed In addition, the terminal may receive an indicator from the base station indicating that transmission of the downlink data has been completed. If the indicator may be received, the use of the second DRX cycle may be stopped, and the use of the first DRX cycle may be resumed In addition, the terminal may receive an indicator from the base station indicating to apply the first DRX cycle. If the indicator is received, the use of the second DRX cycle may be stopped, and the use of the first DRX cycle may be resumed FIG. 11 is a block diagram illustrating a method for a terminal transmitting uplink data according to an embodiment of the present invention.

Figure 11:
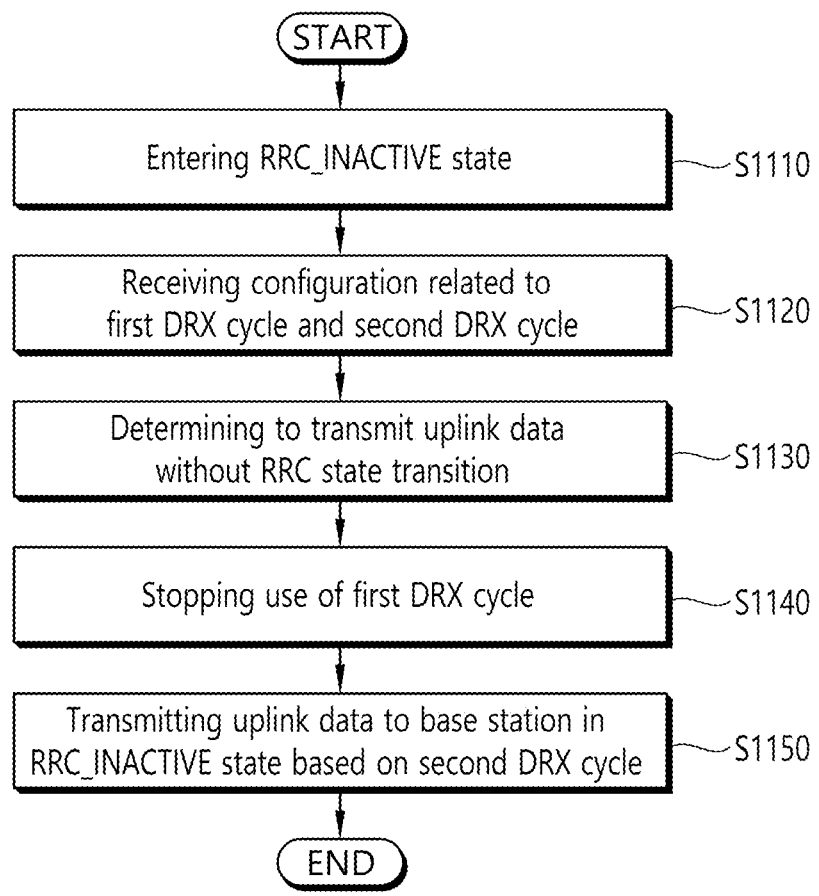
FIG. 11 is a block diagram illustrating a method for a terminal transmitting uplink data according to an embodiment of the present invention.

Referring to FIG. 11, in step S1110, the terminal may enter the RRC_INACTIVE state.

In step S1120, the terminal may receive a configuration related to a first DRX cycle and a second DRX cycle. A period of the first DRX cycle is longer than a period of the second DRX cycle.

In step S1130, the terminal may determine to transmit uplink data without an RRC state transition.

In step S1140, the terminal may stop the use of the first DRX cycle.

In step S1150, the terminal may transmit the uplink data to a base station in the RRC_INACTIVE state based on the second DRX cycle.

If there is data available for transmission in an uplink buffer of the terminal, the data available for transmission may be transmitted to the base station in the RRC_INACTIVE state based on the second DRX cycle. If there is no data available for transmission in an uplink buffer of the terminal, the use of the second DRX cycle may be stopped, and the use of the first DRX cycle may be resumed.

If the terminal initiates a random-access procedure, a random-access preamble may be transmitted to the base station in the RRC_INACTIVE state based on the second DRX. If the random-access procedure has been completed, the use of the second DRX cycle may be stopped, and the use of the first DRX cycle may be resumed.

Figure 12:
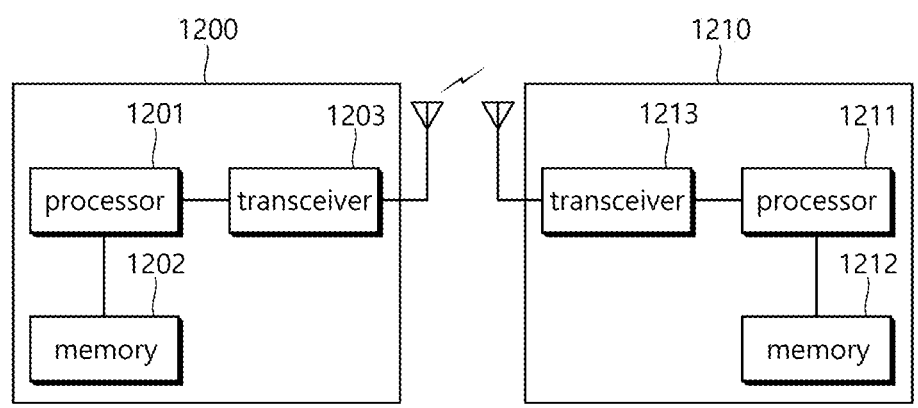
FIG. 12 is a block diagram illustrating a wireless communication system according to an embodiment of the present invention.

FIG. 12 is a block diagram illustrating a wireless communication system according to an embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the BS may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random-access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods on the basis of the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving, by a user equipment (UE), downlink data in a wireless communication system, the method comprising:
    entering a radio resource control (RRC)_INACTIVE state;
    receiving a configuration related to a first DRX cycle and a second DRX cycle;
    receiving a first paging message based on the first DRX cycle;
    stopping the use of the first DRX cycle if the first paging message indicates that downlink data is transmitted to the UE without an RRC state transition; and
    receiving the downlink data from a base station in the RRC_INACTIVE state based on the second DRX cycle.

2. The method of claim 1, further comprising:
    initiating a timer if the downlink data is received, and
    wherein if the timer expires, the use of the second DRX cycle is stopped, and the use of the first DRX cycle is resumed.

3. The method of claim 1, further comprising:
    receiving a second paging message based on the second DRX cycle, and
    wherein if the second paging message does not indicate that downlink data is transmitted to the UE without an RRC state transition, the use of the second DRX cycle is stopped and the use of the first DRX cycle is resumed.

4. The method of claim 1, further comprising:
    receiving an indicator from the base station indicating that transmission of the downlink data is completed, and
    wherein if the indicator is received, the use of the second DRX cycle is stopped, and the use of the first DRX cycle is resumed.

5. The method of claim 1, further comprising:
    receiving an indicator from the base station indicating to apply the first DRX cycle, and
    wherein if the indicator is received, the use of the second DRX cycle is stopped, and the use of the first DRX cycle is resumed.

6. The method of claim 1, wherein the first paging message is received in a paging occasion of the first DRX cycle and the downlink data is received in a paging occasion of the second DRX cycle.

7. The method of claim 6, wherein the paging occasion of the first DRX cycle is calculated based on a first identifier (ID) of the UE, the paging occasion of the second DRX cycle is calculated based on a second identifier of the UE, and wherein the first identifier and the second identifier are differently allocated.

8. The method of claim 1, wherein a period of the first DRX cycle is longer than a period of the second DRX cycle.

9. The method of claim 1, wherein the UE communicates with at least one of a mobile terminal, a network or autonomous vehicles other than the UE.

10. A method for transmitting, by a user equipment (UE), uplink data in a wireless communication system, the method comprising:
    entering a radio resource control (RRC)_INACTIVE state;
    receiving a configuration related to a first DRX cycle and a second DRX cycle;
    determining to transmit uplink data without an RRC state transition;
    stopping the use of the first DRX cycle; and
    transmitting the uplink data to a base station in the RRC_INACTIVE state based on the second DRX cycle.

11. The method of claim 10, wherein if there is data available for transmission in an uplink buffer of the UE, the data available for transmission is transmitted to the base station in the RRC_INACTIVE state based on the second DRX cycle.

12. The method of claim 11, wherein if there is no data available for transmission in an uplink buffer of the UE, the use of the second DRX cycle is stopped, and the use of the first DRX cycle is resumed.

13. The method of claim 10, wherein if the UE initiates a random-access procedure, a random-access preamble is transmitted to the base station in the RRC_INACTIVE state based on the second DRX cycle.

14. The method of claim 13, wherein if the random-access procedure is completed, the use of the second DRX cycle is stopped, and the use of the first DRX cycle is resumed.

15. The method of claim 10, wherein a period of the first DRX cycle is longer than a period of the second DRX cycle.

16. A user equipment (UE) receiving downlink data in a wireless communication system, comprising:
    a memory;
    a transceiver; and
    a processor coupled to the memory, and the transceiver, and
    wherein the processor controls
    entering a radio resource control (RRC)_INACTIVE state;
    receiving a configuration related to a first DRX cycle and a second DRX cycle;
    receiving a first paging message based on the first DRX cycle;
    stopping the use of the first DRX cycle if the first paging message indicates that downlink data is transmitted to the UE without an RRC state transition; and
    receiving the downlink data from a base station in the RRC_INACTIVE state based on the second DRX cycle.

* * * * *